(12) United States Patent
Varner

(10) Patent No.: US 6,580,860 B1
(45) Date of Patent: Jun. 17, 2003

(54) METHOD FOR MAKING SHAPED HIGHLY BIREFRINGENT OPTICAL FIBERS

(75) Inventor: Wayne F. Varner, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/515,187

(22) Filed: Feb. 29, 2000

(51) Int. Cl.[7] .................................................. G02B 6/02
(52) U.S. Cl. ........................................ 385/123; 65/403
(58) Field of Search ................................ 385/123, 124, 385/126, 127; 65/385, 402, 403

(56) References Cited

U.S. PATENT DOCUMENTS

| | | | |
|---|---|---|---|
| 4,179,189 A | 12/1979 | Kaminow et al. | 350/96.33 |
| 4,354,736 A | 10/1982 | Maklad et al. | 350/96.32 |
| 4,395,270 A | 7/1983 | Blankenship et al. | 65/3.12 |
| 4,529,426 A | 7/1985 | Pleibel et al. | 65/3.11 |
| 4,668,264 A | 5/1987 | Dyott | |
| 4,762,387 A * | 8/1988 | Batdorf et al. | 350/96.2 |
| 4,859,223 A | 8/1989 | Kajioka et al. | 65/3.12 |
| 4,896,942 A | 1/1990 | Onstott et al. | |
| 4,932,740 A | 6/1990 | Berkley et al. | 350/96.15 |
| 4,950,047 A | 8/1990 | Berkley et al. | 350/96.23 |
| 4,950,318 A | 8/1990 | Dyott | 65/4.21 |
| 5,276,751 A | 1/1994 | Grard et al. | 385/66 |
| 5,656,888 A | 8/1997 | Sun et al. | |

FOREIGN PATENT DOCUMENTS

| | | | |
|---|---|---|---|
| EP | 0 127 257 A2 | 12/1984 | G01D/5/26 |
| EP | 0 212 954 | 3/1987 | C08B/37/025 |
| EP | 0 098 190 | 9/1987 | G02B/6/38 |
| EP | 0 381 473 A2 | 8/1990 | G02B/6/10 |
| EP | 0 215 674 B1 | 9/1993 | G02B/6/10 |
| EP | 0 918 382 A2 | 5/1999 | H01S/3/06 |
| GB | 2 012 983 | 8/1979 | |
| JP | 58 224306 | 12/1983 | G02B/5/14 |
| JP | 59 217639 | 7/1984 | C03B/37/00 |
| JP | 60 108807 | 6/1985 | G02B/6/16 |
| JP | 61 179403 | 8/1986 | G02B/6/16 |

OTHER PUBLICATIONS

Okamoto et al., *Journal of Lighwave Technolony*, 1985, LT–3(4):758–762.
Pigram et al., *Optical Engineering*, 1994, 33(8):2594–2599.
Ramaswamy et al., *Applied Physics Letters*, 1978, 33(9):814–816.
Paul J. Pigram, et al., "Keyed Optical V–Fiber to Silicon V–Groove Interconnects", Optical Engineering, Aug. 1994, vol. 33, No. 8, pp. 2594–2599.
V. Ramaswamy, et al., "Single Polarization Optical Fibers: Exposed Cladding Technique", Applied Physics Letter, Nov. 1, 1978, vol. 33, No. 9, pp. 814–816.
Katsunari Okamoto, et al., "High–Birefringence Polarizing Fiber with Flat Cladding", 1985 IEEE, Journal of Lightwave Technology, Aug. 1985, vol. LT–3, No. 4, pp. 758–762.
Marcus W. Shute, Sr., and Charles S. Brown, "*A Study of the Polarization Properties of a Rectangular Polarization– Maintaining Fiber*", 1989 IEEE, *Journal of Lightwave Technology*, Dec. 7, 1989, No. 12, pp. 2103–2017.

* cited by examiner

*Primary Examiner*—Euncha Cherry
(74) *Attorney, Agent, or Firm*—Nestor F. Ho; H. Sanders Gwin, Jr.

(57) ABSTRACT

A method for making a highly birefringent optical fiber includes providing a preform with a substantially circular cross section. The preform includes a core region having a substantially circular cross section and a substantially elliptical cladding region adjacent the core region. The outer surface of the preform is modified to create a shaped preform with a non-circular cross section. The shaped preform is then drawn at a temperature and draw rate sufficient to provide an optical fiber with the non-circular cross section of the shaped preform.

12 Claims, 5 Drawing Sheets

METHOD FOR MAKING SHAPED HIGHLY BIREFRINGENT OPTICAL FIBERS

TECHNICAL FIELD

This invention relates to the field of fiber optics. More particularly, this invention relates to shaped highly birefringent optical fibers and methods for their manufacture.

BACKGROUND

Optical fibers that maintain a polarized signal in an optical fiber, referred to as polarization maintaining (PM) fibers, are described, for example, in U.S. Pat. No. 4,896,942. Optical fibers that polarize light from a non-polarized or partially polarized light source, referred to as polarizing (PZ) optical fibers, are described, for example, in U.S. Pat. No. 5,656,888. PM and PZ fibers are used in many different applications, such as sensors, inline fiber devices, Raman lasers, and the like. To polarize or maintain a polarized signal in an optical fiber, the light guiding properties of the core of the optical fiber must be highly birefringent. An elliptical core may cause the anisotropic fiber geometry responsible for this high birefringence. However, this anisotropy is more commonly achieved by depositing or locating adjacent the core diametrically opposed sections of cladding material(s) with substantially higher or lower thermal coefficients of expansion than the outer fiber regions. The diametrically opposed regions define one of the highly birefringent fiber's two transverse orthogonal polarization axes and decouple the components of the wave traveling along the fiber. In a polarizing fiber, one of the decoupled components is leaked to the cladding and completely attenuated, leaving a single linearly polarized wave. In contrast, a polarization maintaining fiber retains both of the orthogonal signal components with virtually no cross-coupling or loss of signal strength.

Typical highly birefringent fiber designs have two perpendicular planes of symmetry. One plane of symmetry passes through the center of the fiber core and its two diametrically opposed cladding regions. The second plane of symmetry, which is normal to the first plane of symmetry, also passes through the center of the fiber core.

Referring to FIGS. 1(a)–(c), a conventional modified chemical vapor deposition (MCVD) process is shown that may be used to make a collapsed optical fiber preform to be drawn into a PM or PZ optical fiber. Referring to FIG. 1(a), a starting preform 10 includes a fused silica support tube 12 with a known refractive index. An optional outer cladding region 14 made of materials with a refractive index either less than or equal to the refractive index of the support tube 12 is deposited on the inside of the tube 12. The outer cladding region 14 is typically a relatively pure deposition region that prevents migration of contaminants from the support tube 12 into the interior regions of the optical fiber. Inside the outer cladding region 14 is a stress region 16 formed by layers of glass with a high thermal coefficient of expansion. The stress region 16 has an index of refraction that approximately matches the index of refraction of the cladding region 14. In longer wavelength PM designs, an optional inner cladding (Iclad) region 18 may be incorporated between the stress region 16 and a core region 20. The inner cladding region 18 has an index of refraction that is closely matched to the index of refraction of the outer cladding 14 in these PM designs. In PZ designs, the inner cladding 18 is normally a narrow depressed index region. The core region 20 has an index of refraction sufficiently higher than the index of refraction of the surrounding regions to ultimately create a waveguiding region 21 needed for single mode operation at the design wavelength. The waveguiding region 21 typically includes the core 20 and the region immediately adjacent the core, but FIG. 1(a) illustrates a more general case in which the waveguiding region 21 includes the core 20 and at least one other region between the core 20 and the support tube 12.

Referring to FIG. 1(b), the starting preform 10 of FIG. 1(a), which has a substantially circular cross-section, is then ground equally on opposite sides 24, 26 to form a ground preform 22 with a non-circular outer periphery, also referred to herein as a non-circular cross-sectional geometry. In this grinding step a substantial amount of the wall thickness of the support tube 12 is removed, and, in some instances, even the outer cladding region 14 may be ground away. The exact amount of material removed in the grind will affect the cutoff wavelength characteristics and the polarizing holding properties of the fiber that is ultimately drawn from the ground preform 22, and as such is a carefully controlled parameter in the fiber manufacturing process.

Referring to FIG. 1(c), the ground preform 22 of FIG. 1(b) is drawn at high temperature (typically, about 21000 C. to about 2200° C.), which causes the ground sides of preform 22 to "circularize" into an optical fiber 30 with a substantially circular cross-section. The circularized optical fiber 30 has an outer cladding 34 and a stress region 36, each with a substantially elliptical cross-section, surrounding an inner cladding region 38 and a core region 40, each with a substantially circular cross-section. Normally, the stress region 36 is made of low melting temperature materials that become fluid during the draw process. This allows the relatively soft outer cladding 34 and the fluid stress region 36 to assume an elliptical cross-sectional shape as the outer fiber region made up of the fused quartz support tube 32 circularizes due to surface tension effects. The inner cladding region 38, if present, retains its substantially circular cross-section, as does the core region 40, to provide, along with the elliptical outer cladding and stress regions, a waveguiding region 31.

The waveguiding region of the PM or PZ optical fiber may also have a core region with a non-circular cross section, such as an ellipse or a rectangle. However, a fiber with a non-circular core design is difficult to splice or connect to conventional round core fibers and generally does not develop sufficient birefringence for more demanding applications.

To maintain or preserve the polarization properties of a signal in an optical fiber, the optical properties of the PM or PZ fiber must be anisotropic. The differing cross-sectional profiles of the layers of the waveguiding region formed by the cladding and core regions in the fiber define two transverse orthogonal axes, which permit the de-coupling of waves polarized along those axes. If a signal launched into these fibers has its polarization aligned with one of these transverse axes, the polarization tends to remain aligned with that axis as the signals are propagated though the fiber. This preserves the polarization of the signal.

PM and PZ fibers often require precise alignment of their transverse orthogonal axes when they are joined to other similar fibers or interfaced to other polarized sources or detectors. For example, to join a PZ fiber with a polarized light source having a known polarization orientation, a polarizer is used to launch light into the fiber, and either the fiber or the polarizer is rotated to identify the axes of maximum and minimum light transmission. The axis of maximum transmission is then aligned with the known polarization orientation of the source. The ratio between the maximum light transmission and the minimum light transmission is referred to as the extinction ratio. To join a PM fiber with another PM fiber, a polarized source or a detector, a similar procedure is used, which requires a polarizer at the fiber input and an analyzer at the fiber output. In this process both the analyzer and the polarizer are rotated to locate the maximum and minimum transmitted power. Both of these procedures require time, optical sources, detectors, lenses, translation stages etc. to identify the axes. Lens tracing techniques can also be used in which light is injected through the side of the fiber and the intensity pattern is scanned on the opposite side to identify the asymmetry. Again, this requires many of the same active components.

SUMMARY

In one aspect, this invention is a method for making a shaped, highly birefringent optical fiber, which includes providing a preform with a substantially circular cross section. This preform has a waveguiding region with a core and a cladding adjacent the core. The core has a substantially circular cross section and the cladding has a substantially elliptical cross section. The outer surface of the preform is modified to create a shaped preform with a non-circular cross section. An optical fiber is then drawn from the shaped preform at a temperature and draw rate sufficient to provide an optical fiber with the non-circular cross section of the shaped preform.

In another aspect, this invention is a highly birefringent optical fiber including a waveguiding region having a core with a substantially circular cross section, and a shaped outer periphery with a non-circular cross-section. The optical fiber preferably includes a cladding adjacent the core, and the cladding has a substantially elliptical cross section. The optical fiber preferably has an aspect ratio of about 1:1 to about 2:1, and the elliptical cladding has an ellipticity of about 0.20 to about 0.70.

In another aspect, this invention is a method for connecting a highly birefringent optical fiber to a device. The highly birefringent optical fiber includes a waveguiding region having a core with a substantially circular cross section, wherein the optical fiber has a shaped outer periphery and non-circular cross-sectional geometry. The device includes a connection region shaped to accept the outer periphery of the optical fiber, and the optical fiber is engaged with the connection region in the device. The interconnection of the fiber and the device rotationally aligns the fiber with respect to the device, and further alignment steps are not required.

The inventive method makes possible the manufacture of a highly birefringent optical fiber with a waveguiding region having a cladding with a substantially elliptical cross-section and a core with a substantially circular cross-section. In addition, this method provides control over the shape of the outer periphery of the fiber that is independent of the cross sectional geometry of the highly birefringent waveguiding region. The non-circular cross-sectional shape of the optical fiber made by this method, which may include an outer surface with one or more flat sides, bumps, slots and the like, preferably has a known orientation to the transverse axes of the waveguiding region of the fiber. The non-circular cross-sectional shape of the fiber provides an easily visible, "passive" means of locating the fiber's transverse, orthogonal birefringent axes, which allows the fibers to be easily aligned with other PM or PZ fibers, sources or detectors without time consuming alignment steps and expensive equipment.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1 is a series of views of an optical fiber preform as is proceeds through a process of making a highly birefringent, elliptically clad optical fiber, in which:

FIG. 2 is a series of views of an optical fiber preform as it proceeds through an embodiment of a process of the invention for making a highly birefringent optical fiber, in which:

Like reference symbols in the various drawings indicate like elements.

DETAILED DESCRIPTION

Figure 2A:
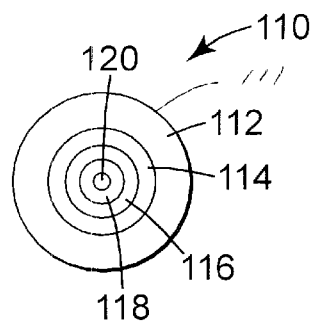
FIG. 2A is a cross-sectional view of the optical fiber preform.

Referring to FIGS. 2(a)–(e), a fabrication process is shown for making a highly birefringent optical fiber. The optical fiber has a shaped outer surface and a non-circular cross section. The core of the optical fiber has a substantially circular cross-section. FIG. 2(a) shows an optical fiber preform 110 made by the modified chemical vapor deposition (MCVD) process that includes a support tube 112.

Figure 2B:
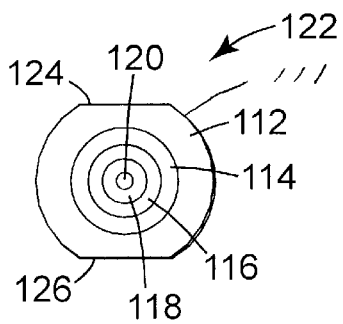
FIG. 2B is a cross-sectional view of a ground optical fiber preform.

As shown in FIG. 2(b), an outer surface of the preform 111 is then modified to create a ground preform 122 with a non-circular cross-section. In this embodiment, the preform 110 is ground equally on opposite sides to create opposed substantially planar regions 124 and 126.

Figure 1A:
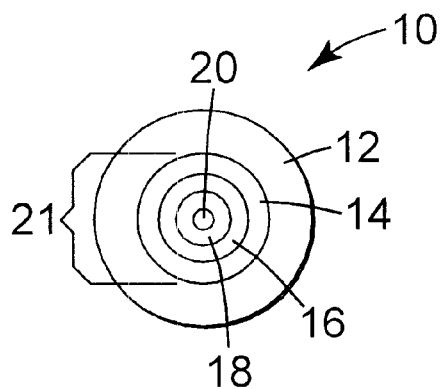
FIG. 1A is a cross-sectional view of the starting optical fiber preform.
Figure 1B:
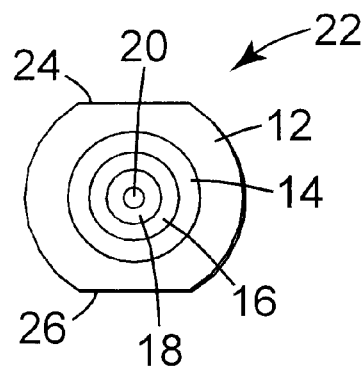
FIG. 1B is a cross-sectional view of a ground optical fiber preform.
Figure 1C:
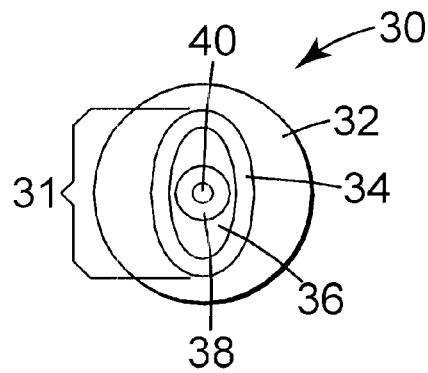
FIG. 1C is a cross-sectional view of a circularized optical fiber preform drawn from the ground preform of FIG. 1B.
Figure 2C:
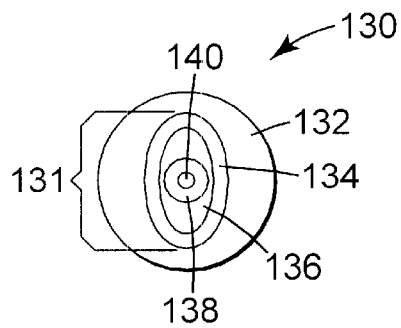
FIG. 2C is a cross-sectional view of a circularized optical fiber preform.

Next, referring to FIG. 2(c), the ground preform 122 is heated to about 2200° C. by a slowly traversing torch to produce a substantially circularized preform 130. If the preform 122 is quite large, a concurrent stretching step is useful to reduce the heat required to successfully circularize the preform. Depending on the traverse speed, size of the preform, composition and thickness of the starting tube and deposited regions, and degree of stretch, the preform 130 may have a substantially circular cross-section or a substantially oval cross-section. In both cases, this step is referred to as "circularizing," which creates a stress region 136 and an outer cladding 134 with a substantially elliptical cross-section that would normally occur during the final draw of the optical fiber (See FIG. 1(c)). The core 140 and the optional inner clad 138 each have a substantially circular cross-section. In addition, the support tube 132 has a substantially circular outer periphery. The elliptical stress region 136 and outer cladding 134, along with the circular core 140 and the inner clad 138, provide a waveguiding region 131 to support single mode operation in the optical fiber that will ultimately be drawn from the preform 130.

The polarization axes of the circularized preform 130 are located by viewing the preform 130 radially in a polarimeter or using a preform profiler to identify the azimuthal locations of the transverse, orthogonal, major and minor axes of the waveguiding region 131 from the geometry of the internal elliptical regions 134, 136. If the preform 130 has a slightly oval shaped cross-section, the transverse polarization axes can be found by measuring the external diameter of the preform—the major axis of the stress ellipse corresponding to the minimum diameter of the circularized preform and the minor axis of the stress ellipse to the maximum diameter of the preform.

In an alternative not illustrated in FIG. 2, the transverse polarization axes of the preform 130 may easily be found after circularization by creating or leaving an alignment feature on the outer surface of the ground preform 122, such as, for example, by leaving a short length of the preform's outer periphery flat. The alignment feature provides precise keying of the transverse polarization axes that is particularly useful for locating the final grinds shown in FIG. 2(d).

Figure 2D:
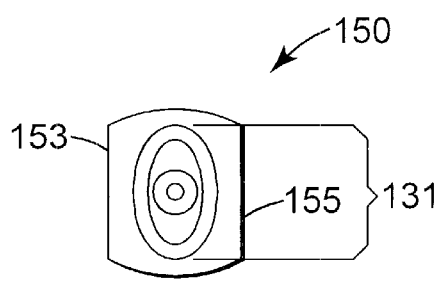
FIG. 2D is a cross-sectional view of a modified preform with a shaped outer surface.

Referring to FIG. 2(d), the substantially circular or oval cross-sectional shape of the circularized preform 130 is then modified to create a preform 150 with a shaped outer surface and a non-circular cross section. The non-circular portion or portions of the preform 150 create an alignment feature that is preferably oriented to the transverse polarization directions of the preform, although such an arrangement is not required. Typically, to modify the shape of the preform 130, portions of the outer surface of the support tube 132 are removed by mechanical grinding or chemical etching. However, material may be added to the outer surface of the support tube 132 by, for example, chemical vapor deposition.

The process of the invention makes it possible to fabricate an elliptically clad, circular core fiber with many different surface features built into a substantially circular cross sectional profile. After the preform has been circularized, the cross-sectional geometry of the preform 130 can be changed into any useful configuration for identifying the location of the internal transverse polarization axes of the fiber. Useful external alignment features on the outer surface of the preform include longitudinal slots, one or more flat sides, and protruding lug(s).

In the embodiment of FIG. 2(d), the outer surface of the preform 130 is modified to create a preform 150 with a substantially non-circular cross-section. The embodiment illustrated in FIG. 2(d) includes a parallel third planar surface 153 and a fourth planar surface 155 on opposite sides of the outer surface of the preform 150. The planar surfaces 153, 155 can be any convenient depth. This depth affects the thickness between the flat portions of the final fiber subsequently drawn from the fourth preform 150.

Figure 2E:
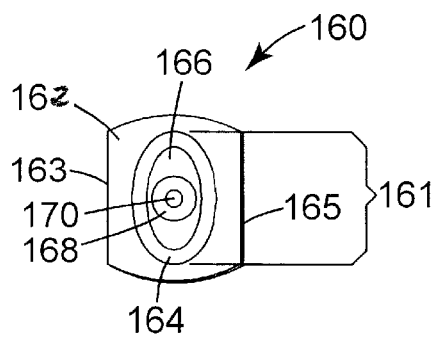
FIG. 2E is a cross-sectional view of an optical fiber drawn from the modified preform of FIG. 2D.

Referring to FIG. 2(e), the second preform 150 is drawn to create a highly birefringent optical fiber 160 with a substantially non-circular cross-section. The fiber 160 is drawn at high tension at a relatively low temperature and/or high speed sufficient to retain the non-circular cross-sectional features of the preform 150. Typically, depending on the composition of the layers in the preform, the draw rate, and the intended final shape of the optical fiber, the draw temperature ranges from about 1600° C. to about 2100° C., and a temperature of about 2000° C. is preferred. The draw rate may vary widely depending on the preform composition, the draw temperature, and the intended final shape of the optical fiber, but a draw rate of about 5 m/min to about 200 m/min is acceptable, and a draw rate of about 100 m/min is preferred.

The drawn fiber 160 includes a support tube glass region 162 with a non-circular cross section, in this embodiment having an outer surface with opposed flats 163, 165. The fiber 160 also includes an outer cladding 164 and a deposited stress region 166, each with a substantially elliptical cross-section. The fiber 160 also includes an inner clad 168 and a core 170, each with a substantially circular cross-section. The elliptical outer cladding 164 and stress region 166, along with the circular inner clad 168 and core 170, provide a waveguiding region 161.

Figure 3:
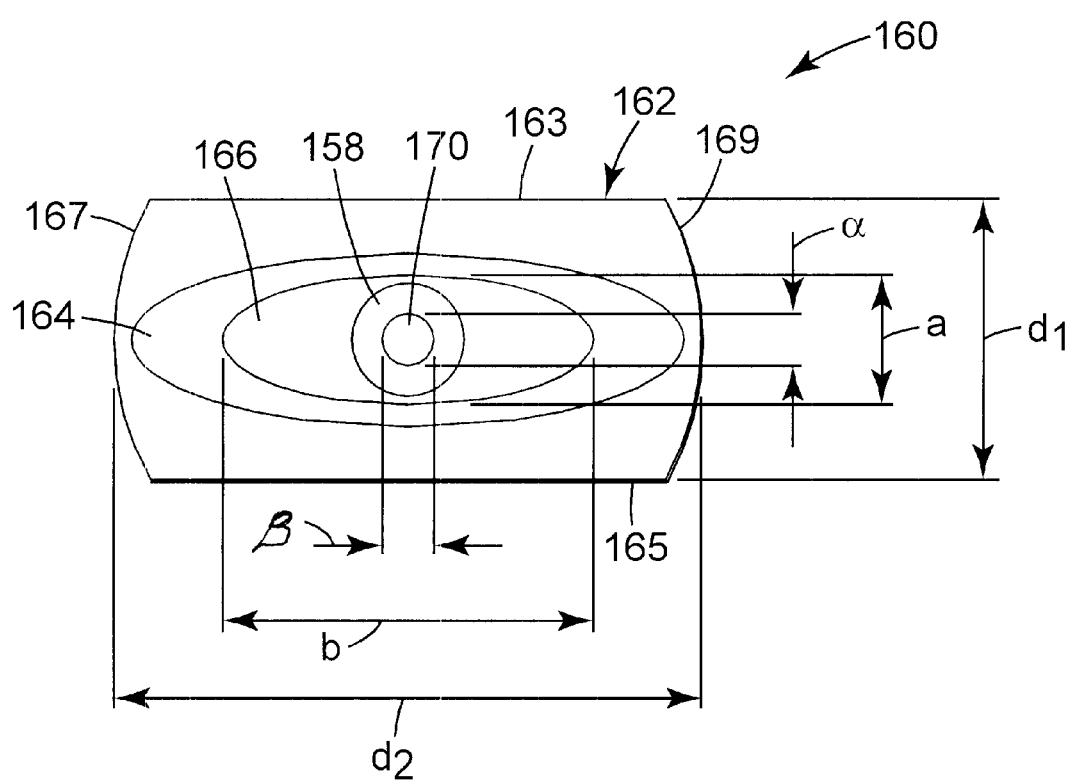
FIG. 3 is a schematic cross-sectional view of an embodiment of a highly birefringent, optical fiber made using the process of the present invention.

A cross section of the drawn fiber 160 is shown in FIG. 3. The fiber 160 has a non-circular cross-sectional geometry including an outer surface with the first substantially planar surface 163 and the second substantially planar surface 165 in the support tube glass region 162. The cross sectional profile of the fiber 160 also features opposed, arcuate surfaces 167, 169 in the support tube 162. The deposited outer cladding region 164 and the stress region 166 have a substantially elliptical cross section with stress region 166 having a major axis b and a minor axis a. The axes a and b also define the respective transverse, orthogonal polarization directions for the fiber 160. In this example, the planar surfaces 163, 165 are substantially aligned with the major axis b of the elliptical waveguiding guiding region, and enable rapid visual identification of the polarization directions of the fiber 160. Of course, depending on the alteration of the circular cross-section of the circularized preform (See FIGS. 2(c) and 2(d)) by, for example, grinding or chemical vapor deposition, the features of the outer periphery of the fiber 160 and the transverse polarization axes of the fiber 160 may be associated with one another in a myriad of different ways.

The process of the present invention uses simple glass grinding techniques and non-contact heat to generate the elliptical clad region. The second grinding step (FIG. 2(d)) disassociates the outer peripheral shape of the drawn fiber from the cross sectional shape of the waveguiding region of the fiber. After draw, the proportions of the elliptical sections 164, 166 of the waveguiding region of the fiber 160 are substantially the same as in the preform 130 (FIG. 2(c)). The elliptical portions of the drawn fiber 160 have an ellipticity, defined by the formula $(b-a)/(b+a)$, of about 0.20 to about 0.70, preferably about 0.30 to about 0.40 for PM fibers, and preferably about 0.40 to about 0.70 for PZ fibers.

Since the core is not under any significant stress during the heating and circularizing process, it remains round, even for relatively high concentrations of core and Iclad dopants. The decoupling of the outer fiber shape from the shape of the deposited regions allows the inner clad region 168 and the core 170 to maintain a substantially circular cross section with an ellipticity, defined by the formula $(\beta-\alpha)/(\beta+\alpha)$ of about 0.009 to about 0.011.

The decoupling of the outer fiber shape from the shape of the internal waveguiding regions also allows more control over the shape of the outer periphery of the fiber. In this embodiment, the cross-sectional shape of the fiber 160 is substantially more "square" than has been possible with conventional highly birefringent fiber fabrication techniques. For example, fiber made by the process of the invention has an aspect ratio, defined in FIG. 3 as the ratio of the diameter of the rounded ends, $d_2$, to the distance between the flats, $d_1$, of about 1:1 to about 2:1.

To minimize bend-induced cross-coupling and maximize mechanical protection, one or more coatings (not shown in FIGS. 2–3) may be applied in a conventional manner during the draw.

Figure 4:
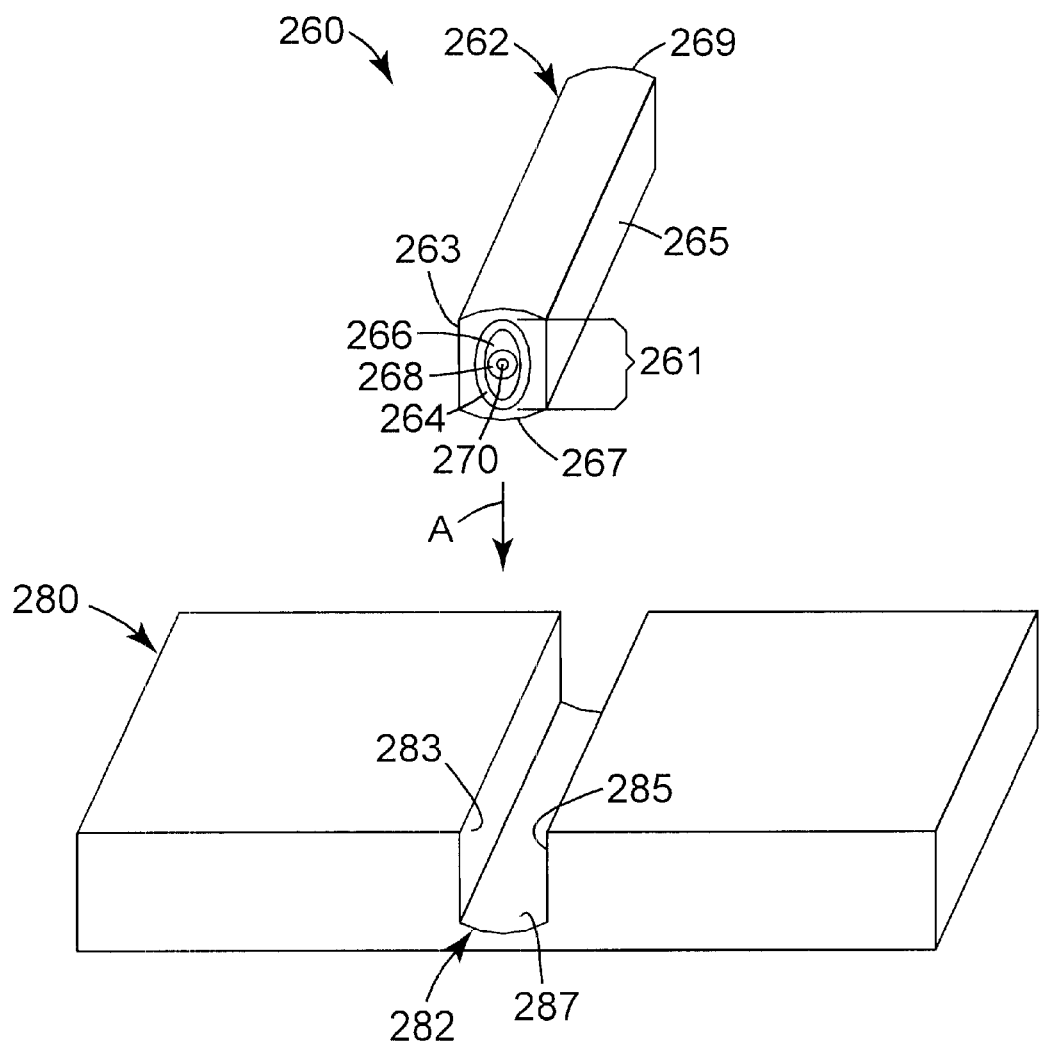
FIG. 4 is a schematic representation of an interconnection procedure for a highly birefringent optical fiber and a device.

Referring to FIG. 4, a method is illustrated for connecting a shaped highly birefringent optical fiber 260 with a non-circular outer periphery to a device 280. The highly birefringent optical fiber 260 includes a waveguiding region 261 having a core 270 and an inner cladding 268, each with a substantially circular cross section, and a deposited stress region 266 and an outer cladding region 264, each with a substantially elliptical cross section. The outer surface 262 of the fiber 260 has a non-circular peripheral shape and a non-circular outer cross-sectional geometry. The outer surface 262 includes a first substantially planar surface 263, an opposed, second substantially planar surface 265, and opposed arcuate surfaces 267 and 269. The non-circular features on the outer surface of the optical fiber 260 preferably have a predetermined relationship to the transverse polarization axes of the optical fiber. FIG. 4 illustrates one possible arrangement in which the planar surfaces 263, 265 of the outer surface of the fiber are substantially aligned with the major transverse polarization axis of the waveguiding region 261.

The device 280 includes a connection region 282 shaped to accept the non-circular outer shape of the optical fiber 260. The connection region 282 includes opposed substantially planar surfaces 283, 285, as well as a bottom region 287. When the optical fiber 260 is moved in the direction of arrow A and is placed into the connection region 282, the planar surfaces of the fiber 263, 265 engage the corresponding planar surfaces 283, 285 of the connection region 282. This engagement locks the optical fiber 260 into a specific rotational alignment.

Figure 5:
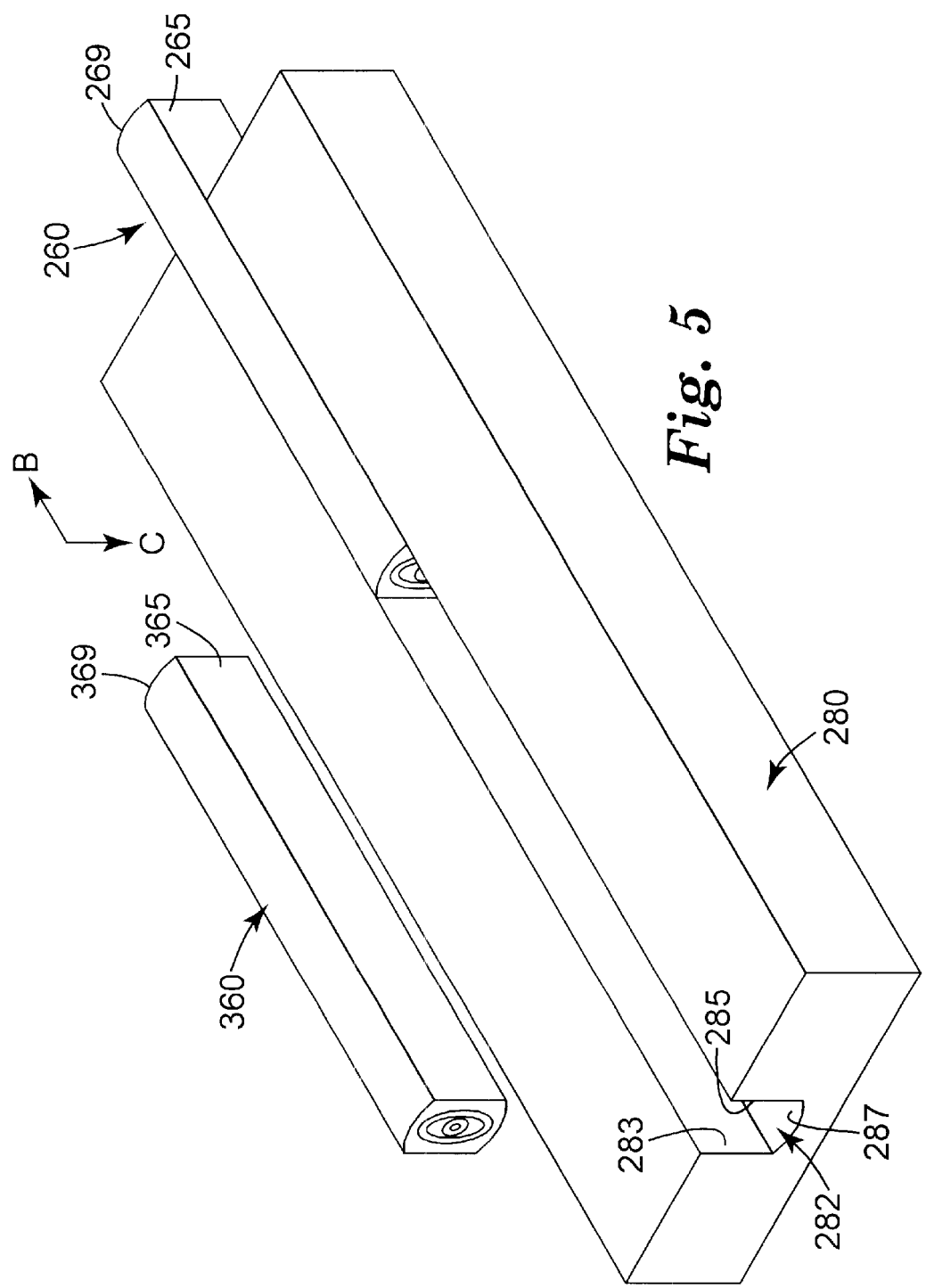
FIG. 5 is a schematic representation of an interconnection procedure.

Referring to FIG. 5, the highly birefringent optical fiber 260 is shown secured in the connection region 282 of the device 280. A second highly birefringent optical fiber 360 with an outer periphery having, for example, a planar surface 365 and an arcuate surface 369 corresponding to the surfaces 265 and 269 in the optical fiber 260 may then be moved in the direction of arrows B and C, and inserted into the connection region 282. The fiber 360 may be placed in an abutting, end-to-end relationship with the optical fiber 260 and secured into position with an adhesive or a clamp (not shown in FIG. 5). Assuming that the polarization directions of the fibers 260 and 360 are similarly aligned with respect to their non-circular outer shapes, the interlocking interconnection greatly simplifies the connection process, and eliminates the need for time consuming rotational alignment procedures.

The example of FIG. 5 illustrates how two substantially identically shaped highly birefringent optical fiber might be interconnected, but it should be understood that the shaped birefringent optical fibers described in this application may be easily interconnected with other devices such as polarized light sources, laser diodes, modulators, switches and the like.

EXAMPLES

Example 1

Three PM preforms, referred to as 910510, 971023, and 981118, were fabricated for a wavelength of 820 nm when drawn into an outer cladding diameter of 80 μm. The preform design was outlined in U.S. Pat. No. 4,896,942. To lower the operating wavelength, the standard 820/80 (820 nm operating wavelength/80 μm final optical fiber diameter) preforms were each overcollapsed using a 17 mm inside diameter by 21 mm outside diameter hollow, fused silica tube, which increased the diameter of the preforms to about 17.2 mm. The preforms were then ground to form two opposite flat faces by removing 3.55 mm (0.140 inch) of fused silica from each side.

The flat-sided preforms were then circularized by placing them in a horizontal glass lathe that was specially equipped with a motor driven translatable set of jaws on one end of the preform. The preforms were heated to about 2257° C. using a $H_2/O_2$ torch, the movable set of jaws was set in motion in a first stretching direction at a rate of about 2.46 mm/min, and the torch, was set in motion in a second direction opposite the first direction at about 5.5 mm/min. The resulting oval-shaped circularized preforms had a minimum diameter of about 10.6 mm and a maximum diameter of about 12.5 mm.

The larger diameter of the circularized preform 910510 was then ground flat by removing 1.77 mm (0.070 inch) of glass from each of the larger diameter lobes, which resulted in a final second ground preform diameter dimension of 10.6 mm between the rounded portions of the outer periphery and 8.9 mm between the previously flat portions of the outer periphery.

After cleaning the preform, it was drawn into fiber. Draw conditions were initially set at about 2150° C. and 35 m/min, which resulted in a fiber with a substantially round cross-section and a diamond shaped stress applying region. As the temperature was reduced to about 2050° C., rounded flats were detected, and at 60 m/min and 2050° C. the flats became significantly flatter. At 120 m/min and 2050° C., the flats showed only about 2 μm of bulge per flat side.

The remaining two preforms, 971023 and 981118, were prepared with a different final grind, which was increased to 2.23 mm (0.090 inch) to increase the aspect ratio of the rounded to flat sides. The smaller fiber diameter was used to lower the cutoff wavelengths to a value about 20–30 nm below the 650 nm operating wavelength target. Draw temperatures were in the range of 2010–2050° C., while draw speeds were in the range of 90–140 m/min.

The properties of the PM fibers are summarized in Table 1 below.

TABLE 1

| Perform | Diameter (μm) | Flat Thickness Max (μm) | Flat Thickness Min (μm) | Cutoff (nm) | Atten. (dB/km) | Mode Field Diameter (μm) | Beatlength (mm) | Ellipticity |
|---|---|---|---|---|---|---|---|---|
| 910510 | 78 | 69 | 66 | 770 | 2.6* | 4.5* | 1.88 | 0.31 |
| 971023 | 61 | 49 | 43 | 500 | 16 | 4.2 | 1.78 | 0.28 |

TABLE 1-continued

| Perform | Diameter (μm) | Flat Thickness Max (μm) | Flat Thickness Min (μm) | Cutoff (nm) | Atten. (dB/km) | Mode Field Diameter (μm) | Beatlength (mm) | Ellipticity |
|---|---|---|---|---|---|---|---|---|
| 971023 | 67 | 50 | 46 | 540 | 16 | 4.2 | 1.56 | 0.30 |
| 981118 | 65 | 52 | 47 | 490 | 22 | 4.2 | 1.53 | 0.31 |

*Att'n and MFD measured at 820 nm, all others at 650 nm.

Example 2

A single mode preform similar to the design shown in FIG. 2(a) was fabricated using well-known MCVD processes. A matched-index cladding design was chosen and included both deposited outer and inner cladding regions surrounding a stress region. In this example the inner and outer claddings were formed from phosphorous fluorosilicate glass, although other compositions, including germanium fluorosilicate and pure $SiO_2$, may be used, depending on the desired properties of the fiber. The stress-applying region was made up of a germanium phosphorous borosilicate glass composition that resulted in an index matched to the claddings. Finally, the core region was made up of germanium silicate layers. This preform measured 11.3 mm in diameter in its collapsed state. Additional undeposited cladding glass was then added using a 20×25 mm General Electric synthetic fused silica overcollapse tube and resulted in an overall diameter increase to 18.4 mm.

The preform was then "stretched" to 14.5 mm in diameter using a lathe having a precisely translatable chuck. This step reduced the "thermal mass" of the preform and resulted in a better match to the limited capacity of the heat source that would be used later for the circularization process. With higher capacity burners or smaller preforms, this step could be eliminated. The stretched preform was then ground such that 3.43 mm was removed from each of its opposite sides.

Circularization was accomplished using both a slowly translating $H_2/O_2$ torch and stretching. The preform reached a temperature of 2290° C. during this step. The torch moved along the preform at the rate of 14 mm/min while the movable chuck was stretching the preform at a 1.3 mm/min rate. This process resulted in substantial circularization causing the ground surface to increase from 7.55 mm to 9.45 mm while the unground diameter decreased from 14.5 mm to 11.25 mm. A 12 mm portion of the preform was left unstretched and uncircularized to provide a parallel reference surface to the fast (minor stress) axis. Because this preform is of the oval, "circularized" type, the outside dimensions could also be used to precisely (within +/−2°) locate the polarization axes. Preform profiling using a Photon Kinetics 2600 preform profiler confirmed the correlation of the external diameters to the internal elliptical structure (within +/−2°).

The circularized preform was then overcollapsed with a GE synthetic 17×21 mm fused silica tube resulting in a 16.5×15.1 mm preform. The added glass was needed to obtain an acceptable core to clad ratio to provide the desired cutoff characteristic for 980 nm operation. The flat reference portion was left undisturbed to preserve the reference to the polarization axes.

Finally, the flat surfaces that were parallel to the slow polarization axis of the preform were ground into opposite sides of the preform, 1.47 mm of cladding glass were removed from the 16.5 mm dimension. Had there been a need to design a fiber with the flat surfaces parallel to the fast axis, the grind would have been on the 15.1 mm dimension. This grind resulted in a preform having a dimension between the "flats" and "rounds" of 13.5 mm and 15.1 mm, respectively. The maximum dimension of the preform (the diagonal) was 16.2 mm.

Two sequential draws were performed to obtain 660 nm, 80 μm fiber as well as 980 nm, 125 μm fiber. The fiber nominal dimensions are somewhat arbitrary. In this case the actual target was 78 microns across the rounds for the 660 nm fiber and 125 μm across the rounds for the 980 nm fiber. A dual acrylate coating, available from DSM Desotech, Elgin, Ill. under the trade designations DSM 1-152A (primary, inner coating) and DSM 2-136 (secondary, outer coating) was applied to the fiber during the draw. The draw speed was set to 100 m/min and the induction furnace temperature was 2025° C. By using a relatively fast, cold draw, the preform shape was preserved in the fiber. Open loop draw conditions were used to avoid confusing the closed loop control system with extraneous feedback based on laser micrometer readings from a new angle on a slightly twisted fiber. The preform diameter was constant within +/−0.1 mm resulting in dimensional control to about +/−1 μm on the fibers. The angular alignment of the flat faces of the rectangular fiber to the slow axis of the stress ellipse was within 1–2°, satisfactory for maintaining good polarization holding in a fiber or waveguide aligned to the flat side. Extinction ratio values of 39 dB on the 80 micron fiber and 43 dB on the 125 μm fiber were measured. The beatlength of these fibers was 2.1 mm measured at 630 nm.

Example 3

This preform was fabricated from identical compositions of the matched clad layered regions used in Example 2. A thicker inner cladding was present to reduce the likelihood of stress region related cladding mode losses at the intended 1550 nm operating wavelength. The finished diameter of this preform was 12.6 mm. No additional cladding glass was added to this preform as the clad to core ratio appeared to be correct for the 1550 nm operating wavelength. Next, 2.03 mm of the starting tube glass was ground from each of the opposite faces, resulting in a dimension of 8.54 mm between the flats. The preform was then stretched and circularized by moving the traversing torch along the preform at 8 mm/min while stretching at the rate of 1.3 mm/min. The preform had a surface temperature of 2301° C. during this process. The preform dimensions were found to be nominally circular at 9.30 mm after this step. Approximately 1.10 mm were lost due to "burn off" during this step. A 12 mm length of the preform was left uncircularized for reference purposes. Because this preform was nominally round, no outside dimensional differences could be used to correlate to the preform profiles. Polarimeter measurements and the flat reference portions were used to locate the polarization axes. Finally, 1.0 mm deep flats were then ground parallel to the slow axis of the preform, resulting in a preform having dimensions of 9.30 mm and 7.26 mm between rounds and flats, respectively.

A single draw was performed to obtain 1550 nm/125 μm fiber. The draw speed was 125 m/min and the furnace temperature was 2025° C. A dual coat identical to that used in Example 2 was applied. Using the open loop control scheme, fiber was drawn having a 125 μm round dimension and a 100 μm flat dimension. The slow axis of the stress ellipse was aligned to the flats within 1–2 degrees. The beat length was 2.00 mm at 630 nm and the attenuation was less than 1.5 dB/km.

Other embodiments are within the scope of the following claims.

What is claimed is:

1. A method for making a highly birefringent optical fiber, comprising:
   (a) providing a first preform comprising a substantially circular core and a substantially circular cladding adjacent the core, and a support region adjacent the cladding region;
   (b) grinding an outer surface of the support region of the first preform to form a second preform with a non-circular cross section;
   (c) circularizing at least part of the second preform to provide a third preform with a substantially circular cross section, wherein the third preform comprises a core with a substantially circular cross section, and a cladding adjacent the core, wherein the cladding has a substantially elliptical cross section;
   (d) modifying an outer surface of the third preform to create a fourth preform with a substantially non-circular cross section; and
   (e) drawing the fourth preform to provide an optical fiber with the non-circular cross section of the fourth preform.

2. The method of claim 1, wherein the cross section of the optical fiber has a known orientation to the cladding region.

3. The method of claim 1, wherein the cladding region has a first transverse axis and a second transverse axis orthogonal to the first transverse axis, and said non-circular cross section of the optical fiber has a known orientation to the first and second transverse axes.

4. The method of claim 1, wherein the optical fiber has an externally detectable geometric feature on an exterior surface thereof.

5. The method of claim 4, wherein the cladding region has a first transverse axis and a second transverse axis orthogonal to the first transverse axis, and said geometric feature has a known orientation to the first and second transverse axes.

6. The method of claim 1, wherein step (b) comprises grinding the first preform such that the outer surface of the second preform has first substantially planar region and a second substantially planar region opposite the first planar region.

7. The method of claim 1, wherein the second preform is circularized such that the third preform has a substantially circular cross sectional shape, and an outer surface of the third preform has an alignment feature.

8. The method of claim 7, wherein the cladding region has a first transverse axis and a second transverse axis orthogonal to the first transverse axis, and said alignment feature has a known orientation to the first and second transverse axes.

9. The method of claim 1, wherein step (d) comprises grinding the third preform such that an outer surface of the fourth preform has a first substantially planar region and a second substantially planar region opposite the first planar region.

10. The method of claim 1, wherein the preform is drawn at a temperature of about 1600° C. to about 2000° C.

11. The method of claim 1, wherein the preform is drawn at a rate of about 5 m/min to about 200 m/min.

12. A method for making a highly birefringent optical fiber, comprising:
   (a) providing a first preform comprising
      a waveguiding region comprising a core with a substantially circular cross section and cladding region adjacent the core, wherein the cladding region has a substantially circular cross section, and
      a support region surrounding the waveguiding region;
   (b) grinding the support region of the first preform to form a second preform having an outer surface comprising a first planar surface and a second planar surface;
   (c) circularizing at least part of the second preform to provide a third preform with a substantially circular cross section, wherein the third preform comprises a core with a substantially circular cross section, and a cladding adjacent the core, wherein the cladding has a substantially elliptical cross section with an ellipticity of about 0.20 to about 0.70;
   (d) grinding the third preform to create a fourth preform, wherein the fourth preform has an outer surface comprising a third planar surface and a fourth planar surface; and
   (e) drawing the fourth preform to provide an optical fiber with an aspect ratio of about 1:1 to about 2:1.

* * * * *

UNITED STATES PATENT AND TRADEMARK OFFICE
CERTIFICATE OF CORRECTION

PATENT NO. : 6,580,860 B1
DATED : June 17, 2003
INVENTOR(S) : Varner, Wayne F.

It is certified that error appears in the above-identified patent and that said Letters Patent is hereby corrected as shown below:

Column 2,
Line 23, delete "21000C" and insert therefor -- 2100°C --.

Column 8,
Table 1, delete the term "Perform" and insert therefor -- Preform --.

Signed and Sealed this

Seventh Day of October, 2003

JAMES E. ROGAN
*Director of the United States Patent and Trademark Office*